United States Patent
Cui et al.

(10) Patent No.: US 11,323,594 B2
(45) Date of Patent: May 3, 2022

(54) METHOD, APPARATUS AND TERMINAL DEVICE FOR SYNCHRONOUS EXPOSURE

(71) Applicant: SHENZHEN REALIS MULTIMEDIA TECHNOLOGY CO., LTD, Shenzhen (CN)

(72) Inventors: Yongtai Cui, Shenzhen (CN); Zhe Yan, Shenzhen (CN)

(*) Notice: Subject to any disclaimer, the term of this patent is extended or adjusted under 35 U.S.C. 154(b) by 748 days.

(21) Appl. No.: 16/097,063

(22) PCT Filed: Jun. 12, 2017

(86) PCT No.: PCT/CN2017/087909
§ 371 (c)(1),
(2) Date: Oct. 26, 2018

(87) PCT Pub. No.: WO2018/227327
PCT Pub. Date: Dec. 20, 2018

(65) Prior Publication Data
US 2021/0227101 A1    Jul. 22, 2021

(51) Int. Cl.
*H04N 5/073* (2006.01)
*H04N 5/235* (2006.01)
*H04N 5/247* (2006.01)

(52) U.S. Cl.
CPC ......... *H04N 5/0733* (2013.01); *H04N 5/2353* (2013.01); *H04N 5/247* (2013.01)

(58) Field of Classification Search
CPC ..... H04N 5/0733; H04N 5/2353; H04N 5/247
See application file for complete search history.

(56) References Cited

U.S. PATENT DOCUMENTS

| | | | |
|---|---|---|---|
| 2004/0017486 A1 | 1/2004 | Cooper et al. | |
| 2016/0150491 A1* | 5/2016 | Barrett | H04L 67/12 370/350 |
| 2017/0134619 A1* | 5/2017 | Narayanswamy | H04N 5/0733 |

FOREIGN PATENT DOCUMENTS

| | | | |
|---|---|---|---|
| CN | 101431603 A | 5/2009 | |
| CN | 103338334 A | 10/2013 | |
| CN | 104270567 A | 1/2015 | |
| CN | 104539931 A | 4/2015 | |

* cited by examiner

*Primary Examiner* — Michael E Teitelbaum (57) ABSTRACT

A method, apparatus and terminal device for synchronous exposure applicable to a primary camera in a multi-camera system is provided. The method includes: after receiving an instruction for synchronous exposure, obtaining a plurality of initial hardware time codes by acquiring an initial hardware time code of each camera in the multi-camera system, determining a synchronization reference value according to the plurality of initial hardware time codes and, based on the synchronization reference value and the initial hardware time code of each camera, determining a frame compensation value corresponding to each camera, and transmitting the frame compensation value of each secondary camera to the corresponding secondary camera, such that when the primary camera adjusts an image length according to the corresponding frame compensation value, each secondary camera adjusts an image length of the image according to the corresponding frame compensation value, to synchronize exposure time of all cameras.

18 Claims, 6 Drawing Sheets

METHOD, APPARATUS AND TERMINAL DEVICE FOR SYNCHRONOUS EXPOSURE

CROSS-REFERENCE TO RELATED APPLICATIONS

This application is a national phase entry under 35 U.S.C. § 371 of International Application No. PCT/CN2017/087909, filed on Jun. 12, 2017, the entire content of which is incorporated herein by reference.

FIELD OF THE DISCLOSURE

The present disclosure generally relates to the technical field of multi-camera systems, and more particular, relates to a method, apparatus and terminal device for synchronous exposure.

BACKGROUND

Multi-camera system is based on the principle of computer vision, and established by combining multiple cameras, light sources and storage devices, etc. It has been commonly used in 3D reconstruction, motion capture, multi-view videos and the like. For example, optical motion capture is a technology based on the principle of computer vision, which captures motion by monitoring and tracking the feature points on a target object using multiple high-speed cameras. For any point in the space, once it is seen by two cameras simultaneously, the position of the spot in the space at this moment can be determined. When the cameras continuously take images with a sufficiently high rate, the motion trajectory of this point can be obtained from the image sequences. When multiple points are marked on one object, the motion trajectory of the object can be obtained by using multiple cameras taking images simultaneously.

It is required that multiple cameras participated in the image collecting process are aligned for exposure when collecting each frame of an image. Otherwise, the motion trajectory of a marker obtained by these cameras will be different or even distorted from its real trajectory. Existing technologies for synchronizing multiple cameras commonly rely on a synchronization signal to trigger multiple cameras, by transmitting the synchronization trigging signal to each camera in either wired or wireless manner. However, it has been found in practical applications that the network transmission delay, network instability, and some external environmental factors such as temperature and humidity, would cause unsynchronous exposure when using multiple cameras during the image collecting process.

BRIEF SUMMARY OF THE DISCLOSURE

In view of the above, the present disclosure provides a method, apparatus and terminal device for synchronous exposure, applicable to a primary camera in a multi-camera system, thereby improving the accuracy of synchronous exposure of multiple cameras in the multi-camera system under complex applications.

First aspect of the present disclosure provides a method for synchronous exposure applicable to a primary camera in a multi-camera system, where the multi-camera system includes the primary camera and at least one secondary camera, the method including:

after receiving an instruction for synchronous exposure, obtaining a plurality of initial hardware time codes by acquiring an initial hardware time code of each camera in the multi-camera system;

determining a synchronization reference value according to the plurality of initial hardware time codes and, based on the synchronization reference value and the initial hardware time code of each camera, determining a frame compensation value corresponding to each camera;

transmitting the frame compensation value of each of the at least one secondary camera to the corresponding secondary camera, such that when the primary camera adjusts an image length according to the corresponding frame compensation value of the primary camera, each of the at least one secondary camera adjusts an image length of the image according to the received corresponding frame compensation value to synchronize exposure time of all cameras in the multi-camera system.

Second aspect of the present disclosure provides an apparatus for synchronous exposure applicable to a primary camera in a multi-camera system, where the multi-camera system includes the primary camera and at least one secondary camera, the apparatus including:

an acquisition module configured to, after receiving an instruction for synchronous exposure, obtain a plurality of initial hardware time codes by acquiring an initial hardware time code of each camera in the multi-camera system;

a determination module configured to determine a synchronization reference value according to the plurality of initial hardware time codes and, based on the synchronization reference value and the initial hardware time code of each camera, to determine a frame compensation value corresponding to each camera in the multi-camera system;

an adjustment module configured to transmit the frame compensation value of each of the at least one secondary camera to the corresponding secondary camera, such that when the primary camera adjusts an image length according to the corresponding frame compensation value of the primary camera, each of the at least one secondary camera adjusts an image length of the image according to the received corresponding frame compensation value to synchronize exposure time of all cameras in the multi-camera system.

Third aspect of the present disclosure provides a terminal device for synchronous exposure applicable to a primary camera in a multi-camera system, where the multi-camera system includes the primary camera and at least one secondary camera, the terminal device including: a memory, a processor, a computer program stored in the memory and executable on the processor, where the processor operates the computer program to implement the method according to the first embodiment of the present disclosure.

Fourth aspect of the present disclosure provides a computer-readable storage medium storing a computer program, where the computer program is executed by a processor to implement the method according to the first embodiment of the present disclosure.

The benefits of the present disclosure over the existing technologies reside in:

The technical solution provided by the present disclosure, after receiving an instruction for synchronous exposure, obtains a plurality of initial hardware time codes by acquiring an initial hardware time code of each camera in the multi-camera system through the primary camera; determines a synchronization reference value according to the plurality of initial hardware time codes and, based on the synchronization reference value and the initial hardware time code of each camera, determines a frame compensation value corresponding to each camera in the multi-camera system; and transmits the frame compensation value of each secondary camera to the corresponding secondary camera, such that when the primary camera adjusts an image length according to the corresponding frame compensation value of the primary camera, each secondary camera adjusts an image length of the image according to the received corresponding frame compensation value, thereby synchronizing exposure time of all cameras during image collection, and improving the accuracy of synchronous exposure of all cameras in the multi-camera system.

BRIEF DESCRIPTION OF THE DRAWINGS

To illustrate the embodiments of the present disclosure more clearly, a brief description of the accompanying drawings consistent with the described embodiments is in the following.

DETAILED DESCRIPTION

Prior to the detailed description of the embodiments of the present disclosure, the cause for nonsynchronous exposure in a multi-camera system is analyzed herein.

Generally, a camera contains a 64-bit hardware timer constructed by FPGA, which is a hardware time code. The hardware time code uses the crystal oscillation cycle of the input clock of the camera sensor (MCLK) as a minimum timing unit. That is, the value of the hardware time code is automatically incremented by one for every crystal oscillation clock cycle.

In one application, when all the cameras have the same initial settings (with the same hardware and software configurations), these cameras have the identical hardware time codes when collecting one frame of an image. In some other applications, all the cameras have different models of image sensors while all the other hardware and software configurations kept the same. Although these cameras have different image resolutions, the hardware time codes of these cameras are still the same when collecting one frame of an image. In practical applications, however, the actual crystal oscillation clock cycle of a camera is fluctuating, due to some external factors such as temperature and humidity. That is to say, the crystal oscillation clock cycle of each camera may not be equivalent, and the time code of each camera in a multi-camera system may not be the same when collecting one frame of an image, which is the root cause of unsynchronous exposure in the multi-camera system.

In addition, it has been found in practical applications that network transmission delay, network instability and external environmental factors would also cause unsynchronous exposure of multiple cameras during the image collecting process.

To resolve the above problems, the present disclosure provides a method, apparatus and terminal device for synchronous exposure. The following is a detailed description of the embodiments of the present disclosure consistent with the accompanying drawings.

Figure 1:
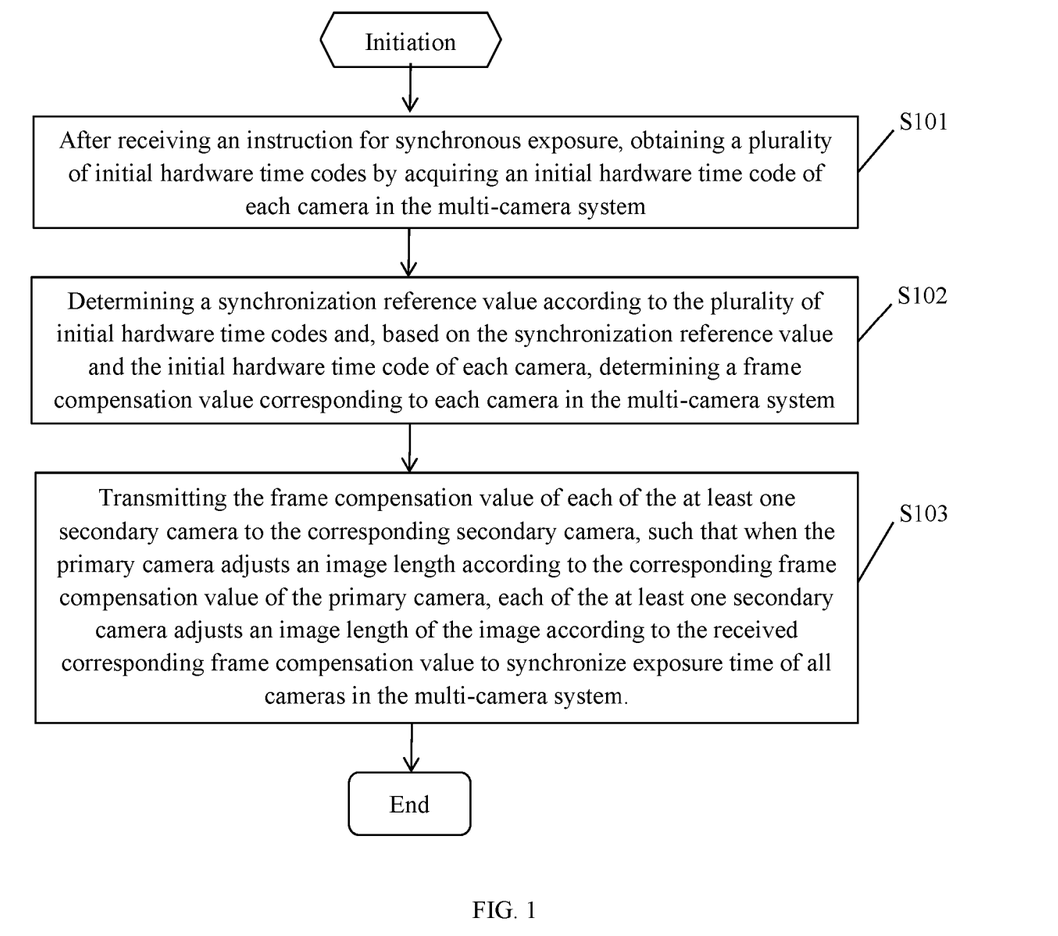
FIG. 1 is a schematic flow chart of an exemplary method for synchronous exposure according to the first embodiment as described in the present disclosure.

Referring to FIG. 1, FIG. 1 is a schematic flow chart of an exemplary method for synchronous exposure according to first embodiment as described in the present disclosure. As shown in FIG. 1, the method for synchronous exposure may include the following steps:

Step S101: after receiving an instruction for synchronous exposure, obtaining a plurality of initial hardware time codes by acquiring an initial hardware time code of each camera in the multi-camera system;

The exemplary method according to the described embodiments may be applicable to the primary camera in a multi-camera system, where the multi-camera system including the primary camera and at least one secondary camera. The embodiments as described in the present disclosure are used for synchronous exposure of multiple cameras in a multi-camera system during the image collecting process. The primary and secondary cameras may be arranged in advance or randomly assigned. For example, when a multi-camera system is initiated, a server may enumerate all the cameras and distribute to each camera within a local network an IP address list including all the cameras, thereby acquiring a list including all the cameras in the system. The first camera in the list or a randomly chosen one may be arranged as the primary camera and the others as secondary cameras.

In an exemplary embodiment of the present disclosure, an instruction for synchronous exposure may be sent by the primary camera, or by other external terminal devices. When sent by the primary camera, the instruction for synchronous exposure may be a timer inside of the primary camera. Every time the timer finishes counting, an instruction for synchronous exposure may be sent out. In practical applications, for example, when the input clock of a camera sensor has a frequency of 40 MHZ, the phase of the clock may drift one exposure period (1 ms) in approximately every 30 seconds. Therefore, it is necessary to have one synchronous exposure within 30 seconds, as such, an instruction for synchronous exposure may be sent out every 20 seconds.

In the exemplary embodiments of the present disclosure, the exposure time of each camera in a multi-camera system is the same, theoretically. As disclosed above however, the actual crystal oscillation clock cycle in the cameras is changing due to some factors such as temperature and humidity, causing the problem of unsynchronous exposure. To resolve such problem, the exemplary step S101 as described in the embodiments includes acquiring an initial hardware time code of each camera in a multi-camera system, in order to adjust the exposure time of each camera in the multi-camera system according to the acquired hardware time codes, to synchronize exposure time of all cameras in the multi-camera system.

There is a time code register inside of each camera, for reading and writing hardware time codes corresponding to this camera. When the camera sensor initiates, a hardware timing module starts timing. For each frame of an image, both the initiation of an exposure and the duration of the exposure are timed using the hardware time codes recorded by the hardware timing module. Accordingly in this step, the primary camera in the multi-camera system may perform the processing of acquiring the initial hardware time code of each camera in the multi-camera system. Assuming there are N cameras in the multi-camera system, including one primary camera and N−1 secondary cameras, the processing of acquiring initial hardware time codes may include: the primary camera in the multi-camera system reads its own hardware time code through the time code register and assigns it as initial hardware time code $T_1$. Subsequently, the primary camera sends a request of acquiring hardware time codes to each secondary camera in the local network. Once the request was received, the secondary camera in the local network reads its corresponding hardware time code using its time code register and sends the code to the primary camera. The primary camera receives the hardware time codes from the secondary cameras and assigns them as initial hardware time codes $T_2, T_3, \ldots, T_N$, respectively. As such, the initial hardware time codes corresponding to each camera in the multi-camera system T1, $T_2, T_3, \ldots, T_N$ are obtained.

Step S102: determining a synchronization reference value according to the plurality of initial hardware time codes and, based on the synchronization reference value and the initial hardware time code of each camera, determining a frame compensation value corresponding to each camera in the multi-camera system.

After obtaining the initial hardware time codes corresponding to multiple cameras, the primary camera may determine a synchronization reference value according to the plurality of initial hardware time codes. When the primary camera determines the reference value, it may select any one of the plurality of initial hardware time codes. The primary camera may also select a maximum value or a minimum value among the plurality of initial hardware codes. Alternatively, it may compute an average value of the plurality of initial hardware time codes and use the average value as the synchronization reference value. Based on the synchronization reference value and the plurality of initial hardware time codes, a frame compensation value corresponding to each camera may be determined. In addition, the frame compensation value may be computed by the primary camera. For example, a frame extension register of the primary camera may compute the deviation between the synchronization reference value and the initial hardware time code of each camera, and determine the frame compensation value corresponding to each camera.

Step S103: transmitting the frame compensation value of each of the at least one secondary camera to the corresponding secondary camera, such that when the primary camera adjusts an image length according to the corresponding frame compensation value of the primary camera, each of the at least one secondary camera adjusts an image length of the image according to the received corresponding frame compensation value to synchronize exposure time of all cameras in the multi-camera system.

If the computational results indicate that the primary camera needs frame compensation, the primary camera may adjust an image length stored in its frame extension register according to its computed frame compensation value. Meanwhile, the primary camera transmits the frame compensation value of each secondary camera to the corresponding secondary camera via network. After receiving the frame compensation value, the secondary cameras may adjust a frame length of the image stored in its frame extension register, so as to align the exposure time of each camera in the multi-camera system during the image collecting process.

It should be noted that when there was no deviation between the synchronization reference value and the initial hardware time code of the camera, it indicates this camera may not need any frame compensation during the current synchronous exposure process.

It should be further noted that when adjusting a frame length of an image based on the frame compensation value, the cameras in the multi-camera system may adjust the length of the current image frame, thereby achieving synchronous exposure when collecting next frame of the image. That is to say, the next frame of the image is the one to be synchronized. Alternatively, the camera in the multi-camera system may adjust the length of the next image frame according to the frame compensation value, thereby achieving synchronous exposure when collecting the image frame after the next. That is to say, the image frame after the next is the one to be synchronized, and so forth.

The exemplary method for synchronous exposure according to the embodiments of the present disclosure includes: after receiving an instruction for synchronous exposure, obtaining a plurality of initial hardware time codes by acquiring an initial hardware time code of each camera in the multi-camera system; determining a synchronization reference value according to the plurality of initial hardware time codes and, based on the synchronization reference value and the initial hardware time code of each camera, determining a frame compensation value corresponding to each camera; and transmitting the frame compensation value of each secondary camera to the corresponding secondary camera. When the primary camera adjusts an image length according to the corresponding frame compensation value of the primary camera, each secondary camera adjusts an image length of the image according to the received corresponding frame compensation value to synchronize exposure time of all cameras in the multi-camera system. The exemplary method may improve the accuracy of synchronous exposure of multiple cameras in the multi-camera system under complex applications Besides of the inequivalent crystal oscillation clock cycles as described above, it should be understood that some other factors may also cause unsynchronous exposure of multiple cameras in the multi-camera system. These factors may include e.g. the network delay when the primary camera acquires the initial hardware time codes of the secondary cameras, the operation delay when the primary camera acquires the initial hardware time code of each camera, and the hardware accumulation delay of the camera. The acquired initial hardware time code may include these delay values as described above. To further improve the accuracy of synchronous exposure in the multi-camera system, after acquiring the initial hardware time codes, delay correction processing may be performed on the acquired initial hardware time codes before determining the frame compensation value. It should be understood that the delay correction processing may include at least one of network delay correction processing, operation delay correction processing, and hardware accumulating delay correction processing. Correspondingly, after the delay correction processing is performed on the initial hardware time codes to obtain a plurality of corrected hardware time codes, the synchronization reference value may be determined according to the obtained corrected hardware time codes. Meanwhile, the frame compensation value corresponding to each camera may also be determined based on the corrected hardware time codes. A detailed description of exemplary embodiments is as follows, regarding the network delay correction processing, the operation delay correction processing, and the hardware accumulating delay correction processing.

Figure 2:
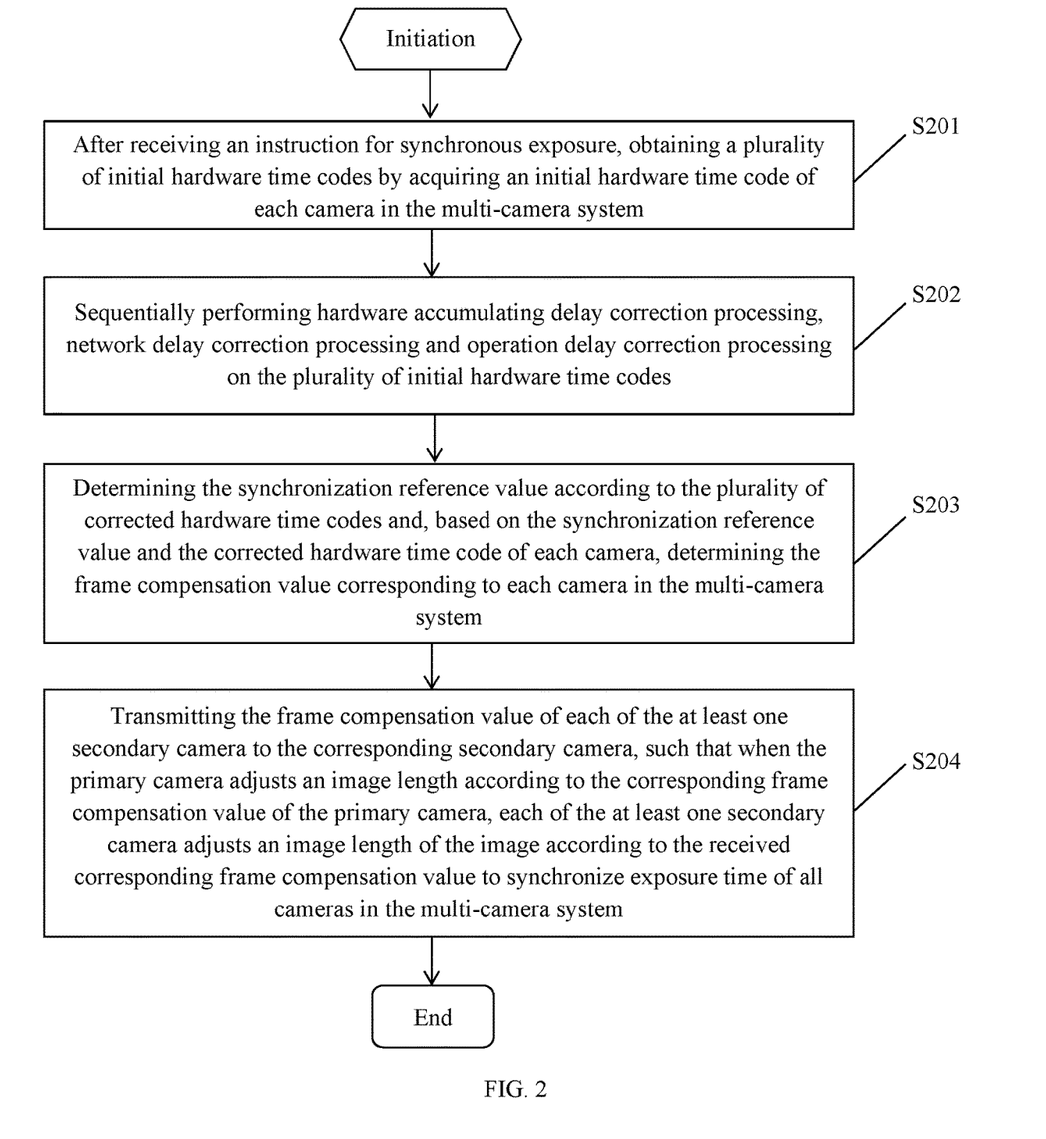
FIG. 2 is a schematic flow chart of an exemplary method for synchronous exposure according to the second embodiment as described in the present disclosure.

Referring to FIG. 2, it is a schematic flow chart of an exemplary method for synchronous exposure according to the second embodiment as described in the present disclosure. As shown in FIG. 2, the exemplary method for synchronous exposure may include the following steps:

Step S201: after receiving an instruction for synchronous exposure, obtaining a plurality of initial hardware time codes by acquiring an initial hardware time code of each camera in the multi-camera system;

Step S202: sequentially performing hardware accumulating delay correction processing, network delay correction processing and operation delay correction processing on the plurality of initial hardware time codes;

A detailed description of exemplary embodiments regarding the hardware accumulating delay correction processing, the network delay correction processing and the operation delay correction processing is as follows.

Firstly, sequentially performing the hardware accumulation delay correction processing on the plurality of initial hardware time codes.

When performing the hardware accumulation delay correction processing, the hardware timer in the camera starts timing once the camera sensor initiates. After working for some time, the crystal oscillation may generate certain accumulation deviation. To eliminate such deviation, a CPU hardware interrupt may be arranged at a preset position of each frame of an image (e.g. the position of the $100^{th}$ pixel). When the interrupt is triggered, the hardware timer may automatically latch an instantaneous time code. Every time the interrupt is triggered, it will latch a time code.

Figure 3:
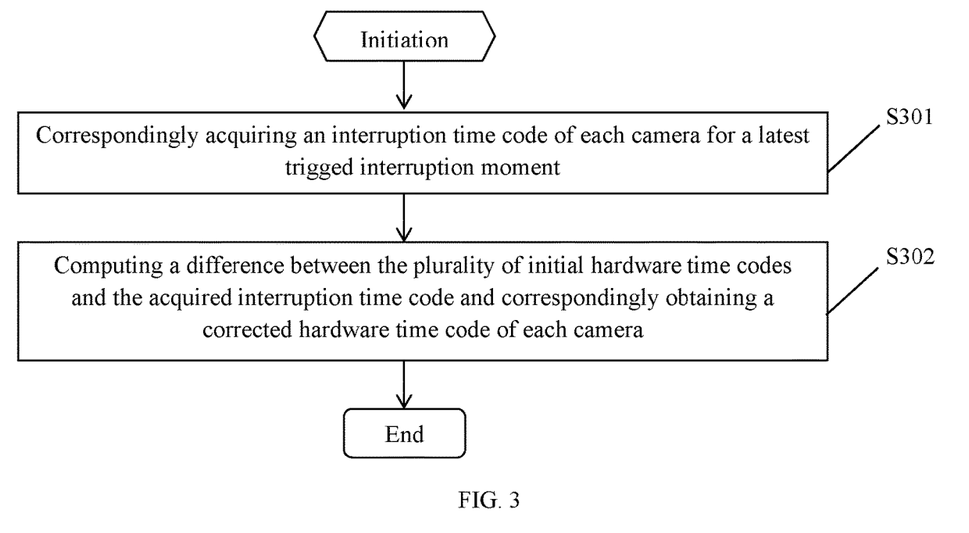
FIG. 3 is a schematic flow chart of an exemplary step S202 in FIG. 2 consistent with disclosed embodiments.

The hardware accumulation delay correction processing as described in Step S202 may follow an exemplary operational procedure as illustrated in FIG. 3.

Referring to FIG. 3, an exemplary hardware accumulation delay correction processing as described in Step S202 may include the following steps:

Step S301: correspondingly acquiring an interruption time code of each camera for a latest trigged interruption moment.

Step S302: computing a difference between the plurality of initial hardware time codes and the acquired interruption time code and correspondingly obtaining a corrected hardware time code of each camera.

As described above, when the interrupt is triggered, the hardware timer may automatically latch an instantaneous time code. Therefore, after reading its initial hardware time code, each camera may further acquire a hardware time code for a latest triggered interruption moment, namely an interruption time code. The difference between the initial hardware time code and the acquired interruption time code may be computed to obtain a corrected hardware time code after the hardware accumulation delay correction processing, thereby eliminating the crystal oscillation deviation.

It should be noted that the primary camera may perform its own hardware accumulation delay correction processing. For the hardware accumulation delay correction processing on secondary cameras, it may be performed by either the primary camera or the secondary cameras. When the primary camera performs the hardware accumulation delay correction processing for the secondary cameras, the secondary camera transmits to the primary camera both the initial hardware time code corresponding to the secondary camera and the interruption time code for a latest trigged interruption moment. The primary camera may compute the difference between the initial hardware time code of the secondary camera and the interruption time code of the secondary camera, and obtain a corrected hardware time code corresponding to this secondary camera.

For example when performing the delay correction processing on the initial hardware time codes, the initial hardware time code for a camera is $T_i$, and the acquired interruption time code of this camera for a latest trigged interruption moment is $T_{i0}$. After the hardware accumulation delay correction processing, the corrected hardware time code $K_i=T_i-T_{i0}$ ($1 \le i \le N$), where $T_i$ is the initial hardware time code for a camera i, and $T_{i0}$ is the interruption time code of the camera i for a latest trigged interruption. For the primary camera after the hardware accumulation delay correction processing, the corrected hardware time code $K_1=T_1-T_{10}$. Accordingly, the corrected hardware time code for the secondary cameras $K_i=T_i-T_{i0}$ ($2 \le i \le N$).

Secondly, performing the network delay correction processing on the initial hardware time codes.

As described in the first embodiment of the present disclosure, when the primary camera acquires the initial hardware time codes of the secondary cameras, it sends a request of acquiring hardware time codes to the secondary cameras. After receiving the request from the primary camera, the secondary camera reads its own hardware time code through its time code register and sends the time code to the primary camera. The time consumption from the primary camera sending a request to the secondary camera receiving such request is namely the network delay as described in the embodiments of the present disclosure. It should be noted that when the primary camera acquires its own initial hardware time code, there is no need to send a request of acquiring the hardware time code. Therefore, the network delay value of the primary camera is zero.

Figure 4:
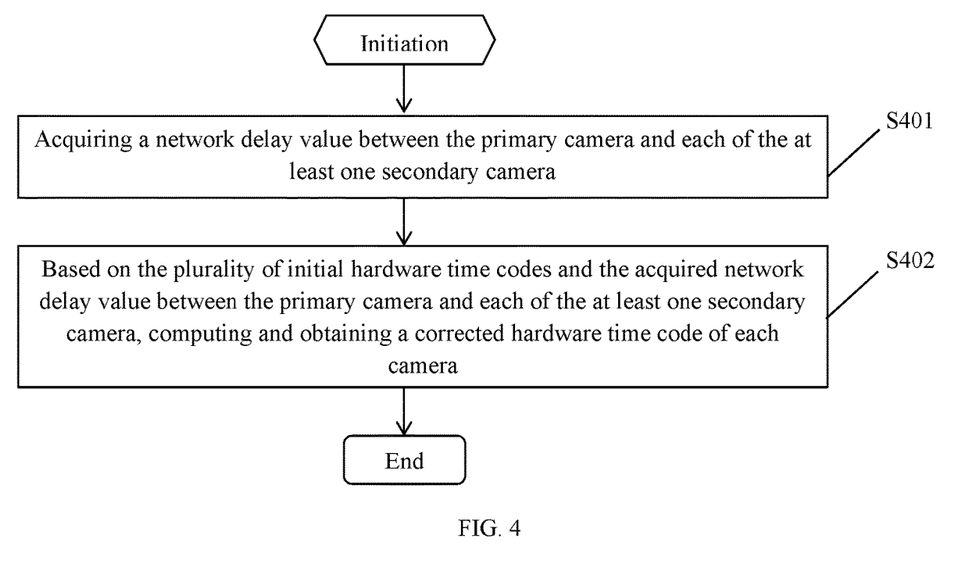
FIG. 4 is a schematic flow chart of another exemplary step S202 in FIG. 2 consistent with disclosed embodiments.

Specifically, the primary camera may perform the network delay correction processing on the initial hardware time codes according to the exemplary procedure as illustrated in FIG. 4.

Referring to FIG. 4, it is a schematic flow chart of an exemplary network delay correction processing consistent with disclosed embodiments. Specifically, the processing may include:

Step S401: acquiring a network delay value between the primary camera and each of the at least one secondary camera.

Step S402: based on the plurality of initial hardware time codes and the acquired network delay value between the primary camera and each of the at least one secondary camera, computing and obtaining a corrected hardware time code of each camera.

An example of implementing step S401 may include:

After a task of synchronous exposure is initiated, the primary camera may measure the network delay between the primary camera and each secondary camera according to the IEEE 1588 Precision Time Protocol and convert it into the unit of crystal oscillation cycle of the sensor clock. As such, the network delay value between the primary camera and each secondary camera may be obtained.

It should be noted that during step S402, the primary camera may compute the difference between the plurality of initial hardware time codes and the acquired network delay value between the primary camera and each secondary camera. It should be understood that there is no network delay between the primary camera and itself, that is, the network delay value of the primary camera is zero. After the network delay correction processing, the corrected hardware time code of the camera $M_i=T_i-Y_i$ ($1 \le i \le N$), where $T_i$ is the initial hardware time code for a camera i, and $Y_i$ is the network delay value of the camera i. After the network delay correction processing, the corrected hardware time code of the primary camera $M_1=T_1$. $Y_1$ is the network delay value of the primary camera, and $Y_1$ is zero. Accordingly, the corrected hardware time code for the secondary camera $M_i=T_i-Y_i$ ($2 \le i \le N$).

Meanwhile, the hardware accumulation delay correction processing has already been performed on the initial hardware time codes as described above in step S202. Accordingly, the corrected hardware time code obtained after the hardware accumulation delay correction processing, namely $T_i-T_{i0}$ ($1 \le i \le N$), should be used in Step S402 for computing the difference. If the hardware accumulation delay correction processing was not performed before, $T_i$ used in Step S402 should be the initial hardware time code $T_i$ ($1 \le i \le N$).

An exemplary embodiment is described in detail as follows.

It is assumed that the network delay values between the primary camera and the secondary cameras acquired by the primary camera are $Y_2, Y_3, \ldots, Y_N$, respectively. Y1 is the network delay value of the primary camera, and $Y_1$ is zero.

After the hardware accumulation delay correction processing and the network delay correction processing, the obtained corrected hardware time code $M_i=K_i-Y_i=T_i-T_{i0}-Y_i$ ($1 \le i \le N$). For the primary camera particularly, after the hardware accumulation delay correction processing and the network delay correction processing, the corrected hardware time code $M_1=K_1-Y_1=T_1-T_{10}$. Accordingly, the corrected hardware time code for the secondary camera $M_i=K_i-Y_i=T_i-T_{i0}-Y_i$ ($2 \le i \le N$).

Thirdly, performing the operation delay correction processing on the initial hardware time codes.

As described in the first embodiment of the present disclosure, the primary camera acquires the initial hardware time code of each camera, respectively. That is to say, the primary camera acquires the initial hardware time code of each secondary camera one by one. Since the multi-camera system may include a plurality of secondary cameras, the timing for the primary camera sending a request of acquiring the initial hardware time code to a certain secondary camera may be different from the timing for the primary camera sending another request to the next secondary camera. As a result, the operation delay correction processing needs to be considered when correcting the initial hardware time codes. Since the primary camera first collects its own initial hardware time code before acquiring initial hardware time codes from all other cameras, there is no operation delay. Therefore, it should be understood that the operation delay value of the primary camera is zero.

Figure 5:
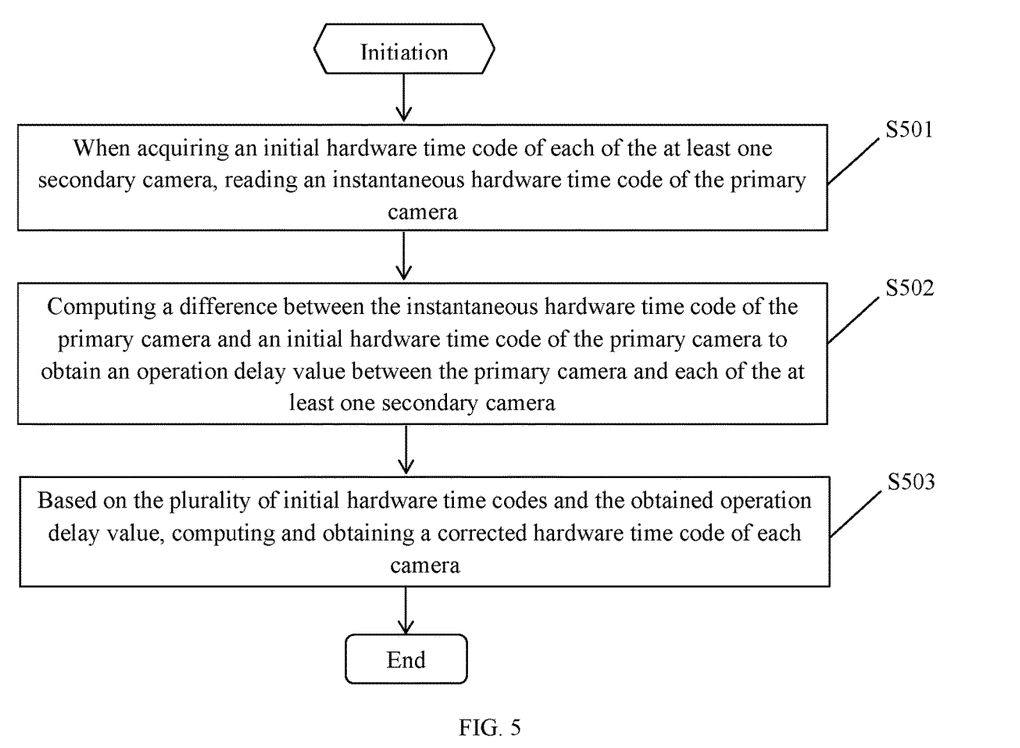
FIG. 5 is a schematic flow chart of another exemplary step S202 in FIG. 2 consistent with disclosed embodiments.

Referring to FIG. 5, it is a schematic flow chart of an exemplary operation delay correction processing consistent with disclosed embodiments including the following steps:

Step S501: when acquiring an initial hardware time code of each of the at least one secondary camera, reading an instantaneous hardware time code of the primary camera.

Step S502: computing a difference between the instantaneous hardware time code of the primary camera and an initial hardware time code of the primary camera to obtain an operation delay value between the primary camera and each of the at least one secondary camera.

Step S503: based on the plurality of initial hardware time codes and the obtained operation delay value between the primary camera and each of the at least one secondary camera, computing and obtaining a corrected hardware time code of each camera.

Referring to Step S501, every time before sending a request of acquiring the initial hardware time code to the secondary cameras, the primary camera may read its own hardware time code, namely an instantaneous hardware time code. Then the primary camera may send the request of acquiring the initial hardware time code to the secondary cameras. After receiving such request, the secondary camera may read its initial hardware time code and send it to the primary camera. An operation delay value between the primary camera and the secondary camera may be determined by computing the difference between the instantaneous hardware time code of the primary camera and the initial hardware time code of the primary camera. That is, the operation delay value $C_i=T_{1i}-T_1$ ($1 \le i \le N$), where $T_1$ is the initial hardware time code of the primary camera, and $T_{1i}$ is the instantaneous hardware time code of the primary camera before acquiring the initial hardware time code from a camera i. It should be understood that there is no operation delay between the primary camera and itself, therefore, the operation delay value of the primary camera $C_1$ is zero.

After the operation delay correction processing, the corrected hardware time code $N_i$ is obtained, and $N_i=T_i-C_i$ ($1 \le i \le N$), where Ti is the initial hardware time code of a camera i and Ci is the operation delay value for the camera i. After the operation delay correction processing, the corrected hardware time code of the primary camera $N_1=T_1$. The network delay value of the primary camera $C_1$ is zero. Accordingly, the corrected hardware time code for the secondary camera $N_i=T_i-C_i$ ($2 \le i \le N$).

It should be noted that the hardware accumulation delay correction processing and the network delay correction processing have already been performed on the initial hardware time codes as described above in step S202. Accordingly, the corrected hardware time code $M_1$ ($1 \le i \le N$) obtained after the hardware accumulation delay correction processing and the network delay correction processing should be used in Step S502 for computing the difference. If neither the hardware accumulation delay correction processing nor the network delay correction processing was performed, $T_i$ used in Step 502 ($1 \le i \le N$) should be the initial hardware time code $T_i$ ($1 \le i \le N$).

An exemplary embodiment of the present disclosure is described in detail as follows.

It is assumed the operation delay values between the primary camera and the secondary cameras are $C_2, C_3, \ldots, C_N$, respectively. The operation delay value of the primary camera is $C_1$ is zero.

After the hardware accumulation delay correction processing, the network delay correction processing and the operation delay correction processing, the corrected hardware time code $N_i$ is obtained, and $N_i=K_i-Y_i-C_i=T_i-T_{i0}-Y_i-(T_{1i}-T_1)$ ($1 \le i \le N$). In particular, after the hardware accumulation delay correction processing, the network delay correction processing and the operation delay correction processing, the corrected hardware time code of the primary camera $N_1=K_1-Y_1=T_1-T_{10}$. Accordingly, the corrected hardware time code for the secondary camera $N_i=K_i-Y_i-C_i=T_i-T_{i0}-Y_i-(T_{1i}-T_1)$ ($2 \le i \le N$).

It should be noted that some of the foregoing embodiments as described in the present disclosure may perform three types of delay correction processing, including the hardware accumulation delay correction processing, the network delay correction processing and the operation delay correction processing. In practical applications, however, only one or two types of the delay correction processing may be chosen to be performed. Whichever type of the delay correction processing being performed on the initial hardware time codes to obtain the corrected hardware time codes, the corrected codes may be computed based on the obtained delay value corresponding to the type of the delay correction processing and the initial hardware time codes.

Step S203: determining the synchronization reference value according to the plurality of corrected hardware time codes and, based on the synchronization reference value and the corrected hardware time code of each camera, determining the frame compensation value corresponding to each camera in the multi-camera system.

As described in step S202, the delay correction processing may be performed on the initial hardware time codes. Then in Step S203, the synchronization reference value may be determined according to the plurality of corrected hardware time codes after the delay correction processing. In particular, the synchronization reference value may be selected as any one of the plurality of corrected hardware time codes. The synchronization reference value may also be selected as a maximum value or a minimum value among the plurality of corrected hardware time codes. Alternatively, an average value of the plurality of initial hardware time codes may be computed and selected as the synchronization reference value.

If only the hardware accumulation delay correction processing was performed on the initial hardware time codes, then the synchronization reference value may be determined according to the corrected hardware time code Ki obtained from the hardware accumulation delay correction processing, and so forth for other types of delay correction. The foregoing embodiments as described in the present disclosure may perform the hardware accumulation delay correction processing, the network delay correction processing and the operation delay correction processing. Accordingly, the synchronization reference value may be determined according to the corrected hardware time code $N_i$ obtained from these correction processing. After the synchronization reference value is determined, all the cameras may be aligned with the camera corresponded with the determined synchronization reference value.

Step S204: transmitting the frame compensation value of each of the at least one secondary camera to the corresponding secondary camera, such that when the primary camera adjusts an image length according to the corresponding frame compensation value of the primary camera, each of the at least one secondary camera adjusts an image length of the image according to the received corresponding frame compensation value to synchronize exposure time of all cameras in the multi-camera system.

In various embodiments of the present disclosure, the primary camera may transmit the determined frame compensation value of each secondary camera to the corresponding secondary camera. The primary may adjust a length of an image according to the corresponding frame compensation value of the primary camera, and each secondary camera may adjust the length of an image according to the corresponding frame compensation value of the secondary camera. As such, both the primary camera and the secondary cameras in the multi-camera system may achieve the synchronous exposure.

Exposure is determined by time codes. If the corrected hardware time code of a camera is larger than the synchronization reference value, it may indicate the hardware time code of the camera is faster than the synchronization reference value. The camera may need to extend the current frame of the image or the next frame of the image, such that the hardware time code of the camera corresponded with the synchronization reference value may catch up, in order to synchronize the exposure time when collecting next frame of the image or the frame after next. If the corrected hardware time code value of a camera is smaller than the synchronization reference value, it may indicate the hardware time code of this camera is slower than the synchronization reference value and it needs to catch up the time code of the camera corresponded with the synchronization reference value. Accordingly, this camera may shorten the current frame or the image or the next frame of the image, such that it catches up the time code of the camera corresponded with the synchronization reference, in order to synchronize the exposure time when collecting next frame of the image or the frame after next.

As described in various exemplary embodiments of the present disclosure, the method for synchronous exposure in a multi-camera system includes: after receiving an instruction for synchronous exposure, the primary camera acquires the initial hardware time code of each camera and performs the delay correction processing on the plurality of initial hardware time codes to obtain a plurality of corrected hardware time codes; determines the synchronization reference value according to the plurality of corrected hardware time codes and, based on the synchronization reference value and the corrected hardware time code of each camera, the frame compensation value corresponding to each camera in the multi-camera system; and transmits the frame compensation value of each of the at least one secondary camera to the corresponding secondary camera, such that when the primary camera adjusts an image length according to the corresponding frame compensation value of the primary camera, each of the at least one secondary camera adjusts an image length of the image according to the received corresponding frame compensation value to synchronize exposure time of all cameras in the multi-camera system.

Figure 6:
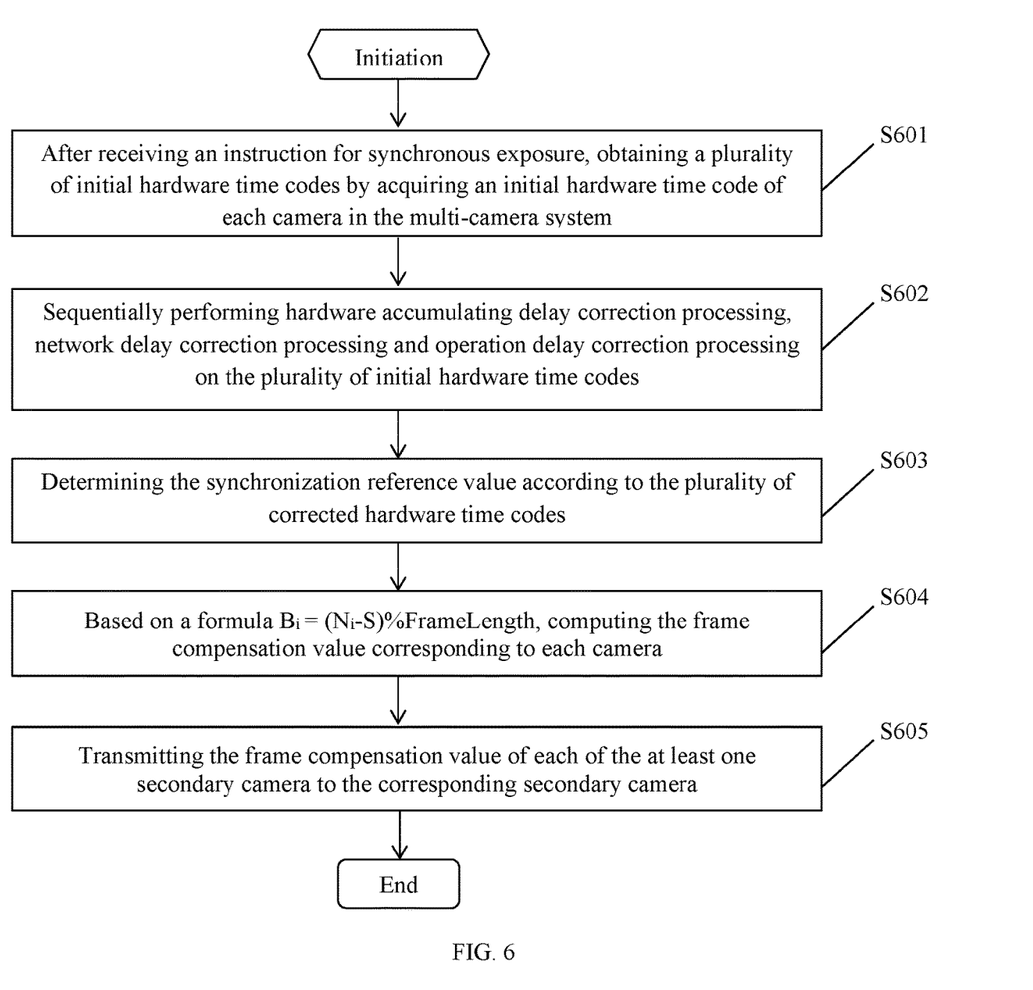
FIG. 6 is a schematic flow chart of an exemplary method for synchronous exposure according to the third embodiment as described in the present disclosure.

Referring to FIG. 6, it is a schematic flow chart of an exemplary method for synchronous exposure according to the third embodiment as described in the present disclosure. The exemplary method as shown in FIG. 6 may include the following steps:

Step S601: after receiving an instruction for synchronous exposure, obtaining a plurality of initial hardware time codes by acquiring an initial hardware time code of each camera in the multi-camera system.

Step S602: sequentially performing the hardware accumulating delay correction processing, the network delay correction processing and the operation delay correction processing on the plurality of initial hardware time codes, to obtain a plurality of corrected hardware time codes.

Step S603: determining the synchronization reference value according to the plurality of corrected hardware time codes.

Step S604: based on a formula $B_i=(N_i-S)$ % FrameLength, computing the frame compensation value corresponding to each camera.

Step S605: transmitting the frame compensation value of each of the at least one secondary camera to the corresponding secondary camera, such that when the primary camera adjusts an image length according to the corresponding frame compensation value of the primary camera, each of the at least one secondary camera adjusts an image length of the image according to the received corresponding frame compensation value to synchronize exposure time of all cameras in the multi-camera system.

The exemplary embodiment as described herein may differ from the foregoing embodiments according to FIG. 2 in the following aspects:

The formula $B_i=(N_i-S)$ % FrameLength as disclosed in step S604 may be used to determine the frame compensation value, where $B_i$ is the frame compensation value corresponding to a camera i; $N_i$ is the corrected hardware time code of the camera i after the delay correction processing; S is the synchronization reference value, FrameLength is an image frame of each camera in the multi-camera system in an oscillation cycle unit and % is a modulo operation. The frame compensation value may be measured as an image frame of each camera in the multi-camera system in a crystal oscillation cycle unit; that is to say, the value may be converted to the time code. Modulo operation may be performed such that the frame compensation value of the camera would not exceed the length of an image frame (the length of an image frame after converted into time codes), as long as the clock phase is aligned.

Moreover, the determined synchronization reference value may be a minimum value selected from the plurality of corrected hardware time codes, to simplify the computation and achieve better results. As such, all the cameras in the multi-camera system may only need to extend the length of the current image frame or the next image frame.

After the frame compensation value is determined, the cameras in the multi-camera system may adjust the length of the current image frame or the length of the next image frame according to the corresponding frame compensation value, in order to achieve the synchronous exposure when collecting the next image frame or the image frame after the next.

The accompanying drawings are not intended to limit any scope of the present disclosure. It should be understood from the foregoing embodiments that the numbers of the steps as shown in the drawings may not indicate the order of implementing these steps, which instead may be determined by the functions of the steps and the internal logics among them. The exemplary method for synchronous exposure has been described in detail according to various foregoing embodiments consistent with the accompanying drawings FIG. 1 to FIG. 6. A detailed description of exemplary embodiments regarding an apparatus, a terminal device and a computer-readable storage medium is in the following with the accompanying drawings. To avoid redundancy, the terms and the corresponding explanations in the foregoing description may not be further described herein.

Figure 7:
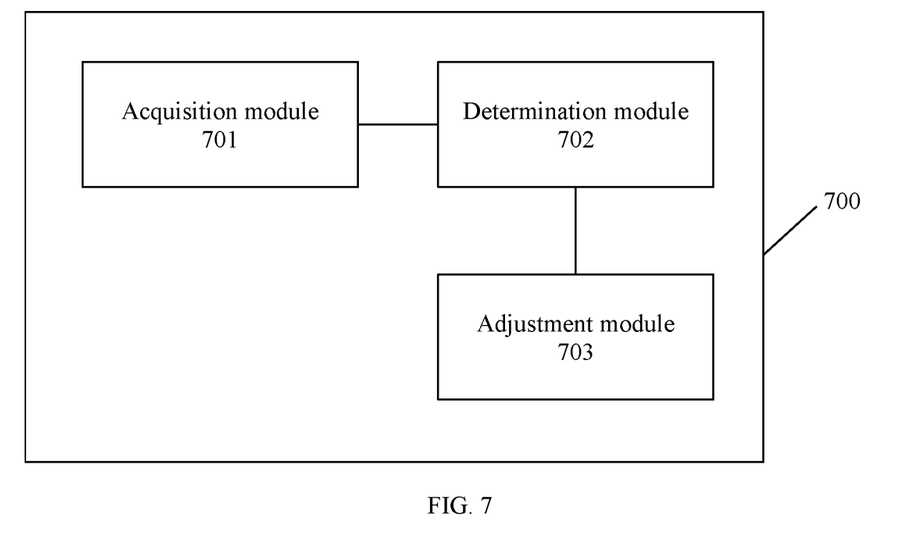
FIG. 7 is a structural block diagram of an exemplary apparatus for synchronous exposure according to the first embodiment as described in the present disclosure.

Referring to FIG. 7, it is a structural block diagram of an exemplary apparatus 700 for synchronous exposure applicable to the primary camera in the multi-camera system, consistent with disclosed embodiments. The multi-camera system may include the primary camera and at least one secondary camera. To simply the description, only the portions related with the embodiments of the present disclosure are shown in the drawing.

The exemplary apparatus 700 for synchronous exposure may be a software unit, a hardware unit, or a combination of software and hardware units built in the primary camera. Alternatively, the apparatus may be an independent component integrated into the primary camera. The exemplary apparatus 700 may include:

An acquisition module 701 configured to, after receiving an instruction for synchronous exposure, obtain a plurality of initial hardware time codes by acquiring an initial hardware time code of each camera in the multi-camera system.

A determination module 702 configured to determine a synchronization reference value according to the plurality of initial hardware time codes and, based on the synchronization reference value and the initial hardware time code of each camera, a frame compensation value corresponding to each camera in the multi-camera system.

An adjustment module 703 configured to transmit the frame compensation value of each of the at least one secondary camera to the corresponding secondary camera, such that when the primary camera adjusts an image length according to the corresponding frame compensation value of the primary camera, each of the at least one secondary camera adjusts an image length of the image according to the received corresponding frame compensation value to synchronize exposure time of all cameras in the multi-camera system.

Figure 8:
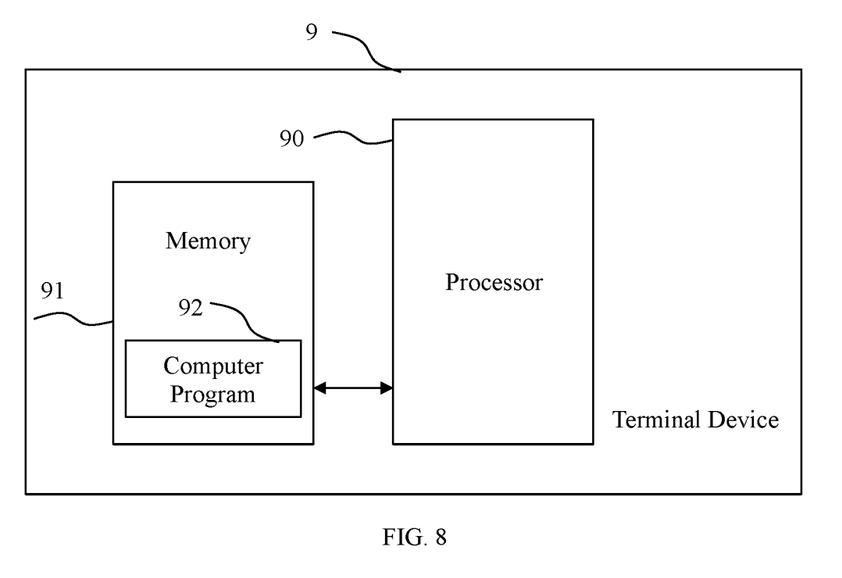
FIG. 8 is a schematic diagram of an exemplary terminal device for synchronous exposure consistent with disclosed embodiments.

FIG. 8 is a schematic block diagram of an exemplary terminal device consistent with the embodiments of the present disclosure. The exemplary terminal device may be the primary camera in the multi-camera system. As shown in FIG. 8, the exemplary terminal device 9 as described in the embodiment may include: one or more processors 90, a memory 91 and a computer program 92 stored in the memory 91 and executable on the processor 90. The processor 90 may execute the computer program 92, to implement the steps of the method for synchronous exposure as described in various foregoing embodiments, e.g. steps S101 to S103 as shown in FIG. 1. Alternatively, the processor 90 may execute the computer program 92, to implement the functions of the modules/units in the apparatus as described in the above embodiment regarding the exemplary apparatus, e.g. the functions of modules 701 to 703 as shown in FIG. 7.

For illustrative purposes, an exemplary computer program 92 may be partitioned into one or more modules/units being stored in the memory 91 and executed by the processor 90, to implement various embodiments of the present disclosure. The one or more modules/units may be a series of computer program instruction segments enabled to perform specific functions. The series of the instruction segments may be used to describe the execution process of the computer program 92 in the terminal device 9. For example, the computer program 92 may be partitioned into an acquisition module, a determination module and an adjustment module.

An exemplary terminal device may include but not limited to a processor 90 and a memory 91. It will be apparent to a person skilled in the art that FIG. 8 is merely an exemplary embodiment of the terminal device 9, and does not constitute any limitation. The terminal device 9 may include more or less components than those are illustrated, or include the combination of certain components or different components.

The processor 90 and the memory 91 may implement the method or the functions of the apparatus for synchronous exposure, provided by the foregoing embodiments as described, thereby improving the accuracy of synchronous exposure of multiple cameras under complex applications.

Moreover, one exemplary embodiment of the present disclosure further provides a computer-readable storage medium storing a computer program. The computer program may be executed by one or more processors to implement the method for synchronous exposure according to various embodiments of the present disclosure.

Part or all of the technical solutions of the embodiments of the present disclosure, in essence or in the form of contribution to a prior art, may be embodied in the form of a software product stored in a storage medium. The software product may include some instructions for a computer or a processor to perform all or part of the steps of the method as described in various embodiments of the present disclosure.

The foregoing embodiments as described are for explaining the technical solutions of the present disclosure, and not intended to be limiting. Although the present disclosure has been described in detail referring to the foregoing embodiments, it is apparent to one ordinary skill in the art that the technical solutions described in these embodiments may be modified, or certain technical features may be substituted with equivalents. These modifications or substitutions do not depart from the scope of the technical solutions of the various embodiments of the present disclosure.

What is claimed is:

1. A method for synchronous exposure applicable to a primary camera in a multi-camera system, wherein the multi-camera system comprises the primary camera and at least one secondary camera, the method comprising:
    after receiving an instruction for synchronous exposure, obtaining a plurality of initial hardware time codes by acquiring an initial hardware time code of each camera in the multi-camera system;
    performing delay correction processing on the plurality of initial hardware time codes to obtain a plurality of corrected hardware time codes, wherein the delay correction processing comprises at least one of network delay correction processing, operation delay correction processing, and hardware accumulating delay correction processing;
    determining a synchronization reference value according to the plurality of initial hardware time codes by determining the synchronization reference value according to the plurality of corrected hardware time codes and, based on the synchronization reference value and the initial hardware time code of each camera, determining a frame compensation value corresponding to each camera in the multi-camera system by determining the frame compensation value based on the synchronization reference value and corrected hardware time code of each camera; and
    transmitting the frame compensation value of each of the at least one secondary camera to the corresponding secondary camera, such that when the primary camera adjusts an image length according to the corresponding frame compensation value of the primary camera, each of the at least one secondary camera adjusts an image length of the image according to the received corresponding frame compensation value to synchronize exposure time of all cameras in the multi-camera system.

2. The method according to claim 1, wherein the delay correction processing comprises the network delay correction processing,
    wherein performing the delay correction processing on the plurality of initial hardware time codes to obtain the plurality of corrected hardware time codes comprises:
    acquiring a network delay value between the primary camera and each of the at least one secondary camera; and
    based on the plurality of initial hardware time codes and the acquired network delay value between the primary camera and each of the at least one secondary camera, computing and obtaining a corrected hardware time code of each camera.

3. The method according to claim 1, wherein the delay correction processing comprises the operation delay correction processing,
    wherein performing the delay correction processing on the plurality of initial hardware time codes to obtain the plurality of corrected hardware time codes comprises:
    when acquiring an initial hardware time code of each of the at least one secondary camera, reading an instantaneous hardware time code of the primary camera;
    computing a difference between the instantaneous hardware time code of the primary camera and an initial hardware time code of the primary camera to obtain an operation delay value between the primary camera and each of the at least one secondary camera; and
    based on the plurality of initial hardware time codes and the obtained operation delay value between the primary camera and each of the at least one secondary camera, computing and obtaining a corrected hardware time code of each camera.

4. The method according to claim 1, wherein the delay correction processing comprises the hardware accumulation delay correction processing,
    wherein performing the delay correction processing on the plurality of initial hardware time codes to obtain the plurality of corrected hardware time codes comprises:
    correspondingly acquiring an interruption time code of each camera for a latest trigged interruption moment; and
    computing a difference between the plurality of initial hardware time codes and the acquired interruption time code and correspondingly obtaining a corrected hardware time code of each camera.

5. The method according to claim 1, wherein the delay correction processing comprises the network delay correction processing and the operation delay correction processing,
    wherein performing the delay correction processing on the plurality of initial hardware time codes to obtain the plurality of corrected hardware time codes comprises:
    acquiring a network delay value between the primary camera and each of the at least one secondary camera;
    when acquiring an initial hardware time code of each of the at least one secondary camera, reading an instantaneous hardware time code of the primary camera;
    computing a difference between the instantaneous hardware time code of the primary camera and an initial hardware time code of the primary camera to obtain an operation delay value between the primary camera and each of the at least one secondary camera; and
    based on the plurality of initial hardware time codes, the network delay value between the primary camera and each of the at least one secondary camera and the operation delay value, computing and obtaining a corrected hardware time code of each camera.

6. The method according to claim 1, wherein the delay correction processing comprises the network delay correction processing and the hardware accumulation delay correction processing,
    wherein performing the delay correction processing on the plurality of initial hardware time codes to obtain the plurality of corrected hardware time codes comprises:
    acquiring a network delay value between the primary camera and each of the at least one secondary camera;
    correspondingly acquiring an interruption time code of each camera for a latest trigged interruption moment; and
    based on the plurality of initial hardware time codes, the network delay value between the primary camera and each of the at least one secondary camera and the interruption time code, computing and obtaining a corrected hardware time code of each camera.

7. The method according to claim 1, wherein the delay correction processing comprises the operation delay correction processing and the hardware accumulation delay correction processing, wherein performing the delay correction processing on the plurality of initial hardware time codes to obtain the plurality of corrected hardware time codes comprises:

when acquiring an initial hardware time code of each of the at least one secondary camera, reading an instantaneous hardware time code of the primary camera;

computing a difference between the instantaneous hardware time code of the primary camera and an initial hardware time code of the primary camera to obtain an operation delay value between the primary camera and each of the at least one secondary camera;

correspondingly acquiring an interruption time code of each camera for a latest trigged interruption moment; and based on the plurality of initial hardware time codes, the operation delay value between the primary camera and each of the at least one secondary camera and the interruption time code, computing and obtaining a corrected hardware time code of each camera.

8. The method according to claim 1, wherein the delay correction processing comprises the network delay correction processing, the operation delay correction processing and the hardware accumulation delay correction processing, wherein performing the delay correction processing on the plurality of initial hardware time codes to obtain the plurality of corrected hardware time codes comprises:

acquiring a network delay value between the primary camera and each of the at least one secondary camera;

correspondingly acquiring an interruption time code of each camera for a latest trigged interruption moment;

when acquiring an initial hardware time code of each of the at least one secondary camera, reading an instantaneous hardware time code of the primary camera;

computing a difference between the instantaneous hardware time code of the primary camera and an initial hardware time code of the primary camera to obtain an operation delay value between the primary camera and each of the at least one secondary camera; and based on the plurality of initial hardware time codes, the network delay value between the primary camera and each of the at least one secondary camera, the operation delay value, and the interruption time code of each camera, computing and obtaining a corrected hardware time code of each camera.

9. The method according to claim 1, wherein based on the synchronization reference value and a corrected hardware time code of each camera, determining the frame compensation value corresponding to each camera in the multi-camera system comprises:

based on a formula $B_i=(N_i-S)$ % FrameLength, computing the frame compensation value corresponding to each camera;

where $B_i$ is a frame compensation value corresponding to a camera i;

$N_i$ is a corrected hardware time code of the camera i after the delay correction processing;

S is the synchronization reference value;

FrameLength is an image frame of each camera in the multi-camera system in an oscillation cycle unit; and % is a modulo operation.

10. The method according to claim 1, wherein determining the synchronization reference value according to the plurality of initial hardware time codes comprises:

selecting a maximum value or a minimum value among the plurality of initial hardware time codes as the synchronization reference value; or computing an average value of the plurality of initial hardware time codes and making the average value as the synchronization reference value.

11. The method according to claim 1, wherein determining the synchronization reference value according to the plurality of corrected hardware time codes comprises:

selecting a maximum value or a minimum value among the plurality of corrected hardware time codes as the synchronization reference value; or computing an average value of the plurality of corrected hardware time codes and making the average value as the synchronization reference value.

12. A terminal device for synchronous exposure applicable to a primary camera in a multi-camera system, wherein the multi-camera system comprises the primary camera and at least one secondary camera, the terminal device comprising:

a memory;

a processor; and a computer program stored in the memory and executable on the processor;

wherein the processor, when executing the computer program, is configured to:

after receiving an instruction for synchronous exposure, obtain a plurality of initial hardware time codes by acquiring an initial hardware time code of each camera in the multi-camera system;

perform delay correction processing on the plurality of initial hardware time codes to obtain a plurality of corrected hardware time codes, wherein the delay correction processing comprises at least one of network delay correction processing, operation delay correction processing, and hardware accumulating delay correction processing;

determine a synchronization reference value according to the plurality of initial hardware time codes by determining the synchronization reference value according to the plurality of corrected hardware time codes and, based on the synchronization reference value and the initial hardware time code of each camera, determine a frame compensation value corresponding to each camera in the multi-camera system by determining the frame compensation value based on the synchronization reference value and corrected hardware time code of each camera; and transmit the frame compensation value of each of the at least one secondary camera to the corresponding secondary camera, such that when the primary camera adjusts an image length according to the corresponding frame compensation value of the primary camera, each of the at least one secondary camera adjusts an image length of the image according to the received corresponding frame compensation value to synchronize exposure time of all cameras in the multi-camera system.

13. The terminal device according to claim 12, wherein the delay correction processing comprises the network delay correction processing, wherein the processor is configured to perform the delay correction processing on the plurality of initial hardware time codes to obtain the plurality of corrected hardware time codes comprises:

acquire a network delay value between the primary camera and each of the at least one secondary camera; and based on the plurality of initial hardware time codes and the acquired network delay value between the primary camera and each of the at least one secondary camera, compute and obtain a corrected hardware time code of each camera.

14. The terminal device according to claim 12, wherein the delay correction processing comprises the operation delay correction processing,
wherein the processor is configured to perform the delay correction processing on the plurality of initial hardware time codes to obtain the plurality of corrected hardware time codes comprises:
when acquiring an initial hardware time code of each of the at least one secondary camera, read an instantaneous hardware time code of the primary camera;
compute a difference between the instantaneous hardware time code of the primary camera and an initial hardware time code of the primary camera to obtain an operation delay value between the primary camera and each of the at least one secondary camera; and
based on the plurality of initial hardware time codes and the obtained operation delay value between the primary camera and each of the at least one secondary camera, compute and obtain a corrected hardware time code of each camera.

15. The terminal device according to claim 12, wherein the delay correction processing comprises the hardware accumulation delay correction processing,
wherein the processor is configured to perform the delay correction processing on the plurality of initial hardware time codes to obtain the plurality of corrected hardware time codes comprises:
correspondingly acquire an interruption time code of each camera for a latest trigged interruption moment; and
compute a difference between the plurality of initial hardware time codes and the acquired interruption time code and correspondingly obtaining a corrected hardware time code of each camera.

16. The terminal device according to claim 12, wherein the delay correction processing comprises the network delay correction processing and the operation delay correction processing,
wherein the processor is configured to perform the delay correction processing on the plurality of initial hardware time codes to obtain the plurality of corrected hardware time codes comprises:
acquire a network delay value between the primary camera and each of the at least one secondary camera;
when acquiring an initial hardware time code of each of the at least one secondary camera, reading an instantaneous hardware time code of the primary camera;
compute a difference between the instantaneous hardware time code of the primary camera and an initial hardware time code of the primary camera to obtain an operation delay value between the primary camera and each of the at least one secondary camera; and
based on the plurality of initial hardware time codes, the network delay value between the primary camera and each of the at least one secondary camera and the operation delay value, compute and obtain a corrected hardware time code of each camera.

17. The terminal device according to claim 12, wherein the delay correction processing comprises the network delay correction processing, the operation delay correction processing and the hardware accumulation delay correction processing,
wherein the processor is configured to perform the delay correction processing on the plurality of initial hardware time codes to obtain the plurality of corrected hardware time codes comprises:
acquire a network delay value between the primary camera and each of the at least one secondary camera;
correspondingly acquire an interruption time code of each camera for a latest trigged interruption moment;
when acquiring an initial hardware time code of each of the at least one secondary camera, read an instantaneous hardware time code of the primary camera;
compute a difference between the instantaneous hardware time code of the primary camera and an initial hardware time code of the primary camera to obtain an operation delay value between the primary camera and each of the at least one secondary camera; and
based on the plurality of initial hardware time codes, the network delay value between the primary camera and each of the at least one secondary camera, the operation delay value, and the interruption time code of each camera, compute and obtain a corrected hardware time code of each camera.

18. A non-transitory computer-readable storage medium containing a computer program for, when executed by one or more processors, performing a method for synchronous exposure applicable to a primary camera in a multi-camera system, wherein the multi-camera system comprises the primary camera and at least one secondary camera, the method comprising:
after receiving an instruction for synchronous exposure, obtaining a plurality of initial hardware time codes by acquiring an initial hardware time code of each camera in the multi-camera system;
performing delay correction processing on the plurality of initial hardware time codes to obtain a plurality of corrected hardware time codes, wherein the delay correction processing comprises at least one of network delay correction processing, operation delay correction processing, and hardware accumulating delay correction processing;
determining a synchronization reference value according to the plurality of initial hardware time codes by determining the synchronization reference value according to the plurality of corrected hardware time codes and, based on the synchronization reference value and the initial hardware time code of each camera, determining a frame compensation value corresponding to each camera in the multi-camera system by determining the frame compensation value based on the synchronization reference value and corrected hardware time code of each camera; and
transmitting the frame compensation value of each of the at least one secondary camera to the corresponding secondary camera, such that when the primary camera adjusts an image length according to the corresponding frame compensation value of the primary camera, each of the at least one secondary camera adjusts an image length of the image according to the received corresponding frame compensation value to synchronize exposure time of all cameras in the multi-camera system.

* * * * *